United States Patent
Hendricks

(10) Patent No.: US 9,405,435 B2
(45) Date of Patent: Aug. 2, 2016

(54) DEVICE NAVIGATION ICON AND SYSTEM, AND METHOD OF USE THEREOF

(71) Applicant: HENDRICKS INVESTMENT HOLDINGS, LLC, Silver Spring, MD (US)

(72) Inventor: John S. Hendricks, Potomac, MD (US)

(73) Assignee: Hendricks Investment Holdings, LLC, Silver Spring, MD (US)

( * ) Notice: Subject to any disclaimer, the term of this patent is extended or adjusted under 35 U.S.C. 154(b) by 168 days.

(21) Appl. No.: 13/667,884

(22) Filed: Nov. 2, 2012

(65) Prior Publication Data

US 2013/0145322 A1 Jun. 6, 2013

Related U.S. Application Data

(60) Provisional application No. 61/554,540, filed on Nov. 2, 2011.

(51) Int. Cl.
*G06F 3/0482* (2013.01)
*G06F 3/0481* (2013.01)

(52) U.S. Cl.
CPC .......... *G06F 3/0482* (2013.01); *G06F 3/04817* (2013.01); *G06F 2203/04802* (2013.01)

(58) Field of Classification Search
CPC .............. G06F 3/0482; G06F 3/04883; G06F 2203/04807; G06F 3/0481; G06F 3/04847; G06F 3/04817; G06T 13/80; G06T 15/02
See application file for complete search history.

(56) References Cited

U.S. PATENT DOCUMENTS

| | | | | |
|---|---|---|---|---|
| 6,043,818 A * | 3/2000 | Nakano et al. | | 715/851 |
| 7,007,242 B2 * | 2/2006 | Suomela et al. | | 715/849 |
| 7,216,305 B1 * | 5/2007 | Jaeger | G06F 3/0481 | 345/419 |
| 8,681,105 B2 * | 3/2014 | Huh et al. | | 345/173 |
| 2007/0164989 A1 * | 7/2007 | Rochford | G06F 3/0482 | 345/156 |
| 2007/0298404 A1 * | 12/2007 | Arnell et al. | | 434/350 |
| 2009/0183100 A1 * | 7/2009 | Eom | G06F 3/0482 | 715/769 |
| 2009/0307633 A1 * | 12/2009 | Haughay, Jr. | G06F 1/1626 | 715/841 |
| 2010/0064259 A1 * | 3/2010 | Alexanderovitc | G06F 1/1626 | 715/852 |
| 2010/0093400 A1 * | 4/2010 | Ju | G06F 3/04817 | 455/566 |
| 2010/0315417 A1 * | 12/2010 | Cho et al. | | 345/419 |
| 2010/0333030 A1 * | 12/2010 | Johns | G06F 3/04815 | 715/834 |
| 2011/0055760 A1 * | 3/2011 | Drayton et al. | | 715/834 |
| 2011/0072492 A1 * | 3/2011 | Mohler et al. | | 726/3 |
| 2011/0093815 A1 * | 4/2011 | Gobeil | G06F 3/0482 | 715/825 |
| 2011/0126157 A1 * | 5/2011 | Lee | G06F 3/0482 | 715/834 |
| 2011/0157053 A1 * | 6/2011 | Webb et al. | | 345/173 |
| 2012/0014663 A1 * | 1/2012 | Knight | G11B 27/034 | 386/240 |
| 2012/0056830 A1 * | 3/2012 | Suzuki | G06F 1/1626 | 345/173 |
| 2012/0056878 A1 * | 3/2012 | Miyazawa et al. | | 345/419 |
| 2012/0066602 A1 * | 3/2012 | Chai et al. | | 715/733 |
| 2012/0260215 A1 * | 10/2012 | Fennel | H04W 4/001 | 715/825 |
| 2012/0260217 A1 * | 10/2012 | Celebisoy | G06F 3/04815 | 715/836 |
| 2012/0260218 A1 * | 10/2012 | Bawel | G06F 3/04815 | 715/841 |
| 2013/0019175 A1 * | 1/2013 | Kotler | G06F 3/0482 | 715/728 |
| 2013/0047121 A1 * | 2/2013 | Kao | G06F 9/44505 | 715/810 |

* cited by examiner

*Primary Examiner* — Jeffrey A Gaffin
*Assistant Examiner* — Mandrita Brahmachari
(74) *Attorney, Agent, or Firm* — Arent Fox LLP

(57) ABSTRACT

Three-dimensional interactive icons and other mechanisms, methods, and systems for easing user selection of information, such as may be presented on screens or other interfaces of devices, such as tablet, telephone and other hand-held devices, and personal computers (PCs).

24 Claims, 19 Drawing Sheets

Swipe fingers left and right to rotate polyhedron, and thus change which facets are visible, or to take other action, such as to select the facet to take up the full screen

DEVICE NAVIGATION ICON AND SYSTEM, AND METHOD OF USE THEREOF

This application claims priority from U.S. Patent Application No. 61/554,540, titled "Device Navigation Icon and System and Method of Use Thereof," filed on Nov. 2, 2011, and which is incorporated herein by reference in its entirety.

FIELD OF THE INVENTION

Aspects of the present invention relate to the field of user navigation of a device, such as a cellular telephone/smart phone or other mobile email and/or Internet enabled device, tablet, other hand-held device, or personal computer, and in particular to a multi-sided interactive navigation icon that enables selection of information and navigation among higher and lower levels of information subsets, among other functions.

BACKGROUND

There remains an unmet need for screen mechanisms, methods, and systems for easing user selection of information, as may be presented on screens or other interfaces of devices, such as cellular telephones/smart phones or other mobile email and/or Internet enable devices, tablets, other hand-held devices, or personal computers (PCs).

One example of interfaces needing additional navigation options are touch screens, particularly for small hand-held devices. In touch screens for handheld devices of the related art, for example, selection often mimics selection typically occurring with a mouse for making selections on PC screens. Such control of selection is often much more difficult on such small touch screens.

SUMMARY

Aspects of the present invention relate to screen mechanisms and other features, such as interactive navigation icons, methods, and systems for providing selective access to information, such as multimedia and other information contained in multiple levels of data files.

In one example implementation, a navigational icon, in accordance with aspects of the present invention, may be used on the screen or other interface of a cellular telephone/smart phone or other mobile email and/or Internet enabled device, tablet, other hand-held device, or a PC. In some variations, the navigational icon is configured for use in conjunction with an interactive interface, such as a device having a touch activated screen (e.g., a smart phone, tablet, or other handheld device).

In some variations, the navigational icon is presented visually on a screen as a multi-faceted, three dimensional shape, such as a three dimensional polyhedron shape. A user may change the view of the icon, including which of the various facets appear, and/or control the access/view of a particular facet, for example, by using the user's finger or other interface mechanism to rotate the icon or cause access to multimedia information associated therewith.

In other configurations or modes of operation, for example, selection of a particular facet may result in the multifaceted navigational icon changing its number of levels and/or number of facets, or otherwise altering in appearance. In yet other configurations or modes of operation, selection of a particular facet may result in presentation of one or more additional options, such as presenting multiple selectable multimedia presentations, among which the user may then choose.

In addition to the multifaceted navigational icon, some variations in accordance with aspects of the present invention include additional interaction features, such as menus of words or other selectable features. For example, menu bars may be displayed above or below the multifaceted navigational icon, allowing aspects of the navigational icon to be varied.

Additional advantages and novel features relating to aspects of the present invention will be set forth in part in the description that follows, and in part will become more apparent to those skilled in the art upon examination of the following or upon learning by practice thereof.

BRIEF DESCRIPTION OF THE DRAWINGS

Aspects of the present invention will become fully understood from the detailed description given herein below and the accompanying drawings, which are given by way of illustration and example only and thus not limited with respect to aspects of the present invention, wherein.

DETAILED DESCRIPTION

Aspects of the present invention provide screen mechanisms, such as interactive navigation icons, methods, and systems for providing selective access to information, such as multimedia and other information contained in multiple levels of data files.

In one example implementation, a navigational icon in accordance with aspects of the present invention may be used on the screen or other interface of a cellular telephone/smart phone or other mobile email and/or Internet enabled device, tablet, other hand-held device, or a PC, for example. In some variations, the navigational icon is configured for use in conjunction with an interactive interface, such as a device having a touch activated screen (e.g., a smart phone, tablet, or other handheld device).

Figure 1:
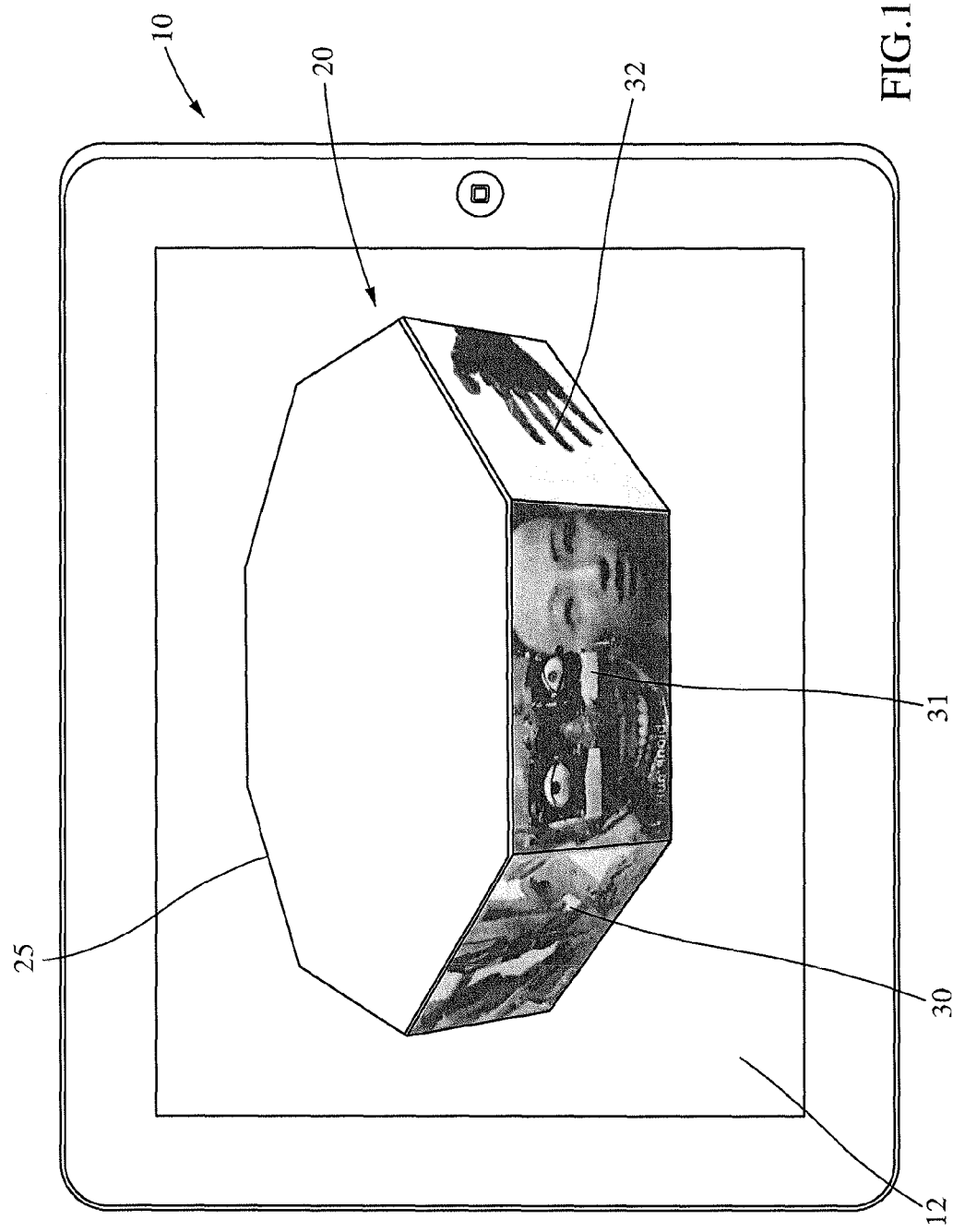
FIG. 1 shows an example three dimensional polyhedron shaped navigational icon displayed on a screen of an example tablet type device, in accordance with aspects of the present invention.

In some variations, the navigational icon is presented visually on a screen as a multi-faceted, three dimensional shape, such as a three dimensional polyhedron shape. FIG. 1 shows an example such three-dimensional polyhedron-shaped navigational icon displayed on a screen of an example tablet, in accordance with aspects of the present invention. As shown in FIG. 1, the tablet 10 has a screen 12, upon which a three-dimensional polyhedron-shaped navigational icon 20 appears. The icon 20 as shown in FIG. 1 includes as visible a top facet 25 and three side facets 30, 31, 32. As described further below, in accordance with aspects of the present invention, the icon 20 may be manipulated to change its appearance (e.g., orientation so as to show other facets; opening of other "layers" for access), and the facets 25, 30, 31 or 32 may be accessed or otherwise manipulated, for example, to allow user access of information associated with each facet, or for opening or other manipulation of each facet.

For example, when viewing the navigational icon 20, the user may select any of the visible facets, including top facet 25 and/or bottom facets, or any of the side facets 30-32 that are visible. The polyhedron may also be rotated to display other facets currently not visible on the icon 20, such as facets located on an opposite side of facets 30, 31 and 32 with respect to the icon 20. The user may select a side facet (e.g., facet 30), for example, by touching the device interface screen at the point at which the facet appears. When a facet is selected, additional actions may occur, depending on the functions corresponding to that facet, as well as other factors (e.g., mode of operation; level of selection). For example, if information associated with the facet is a multimedia presentation, selection of the facet may result in a pop-up window or new screen being displayed, in which the multimedia presentation begins to play or otherwise be accessed. Multimedia could include, for example, an electronic book, a video presentation, interactive 3D, or interactive computer generated TDI, among other media.

Figure 2:
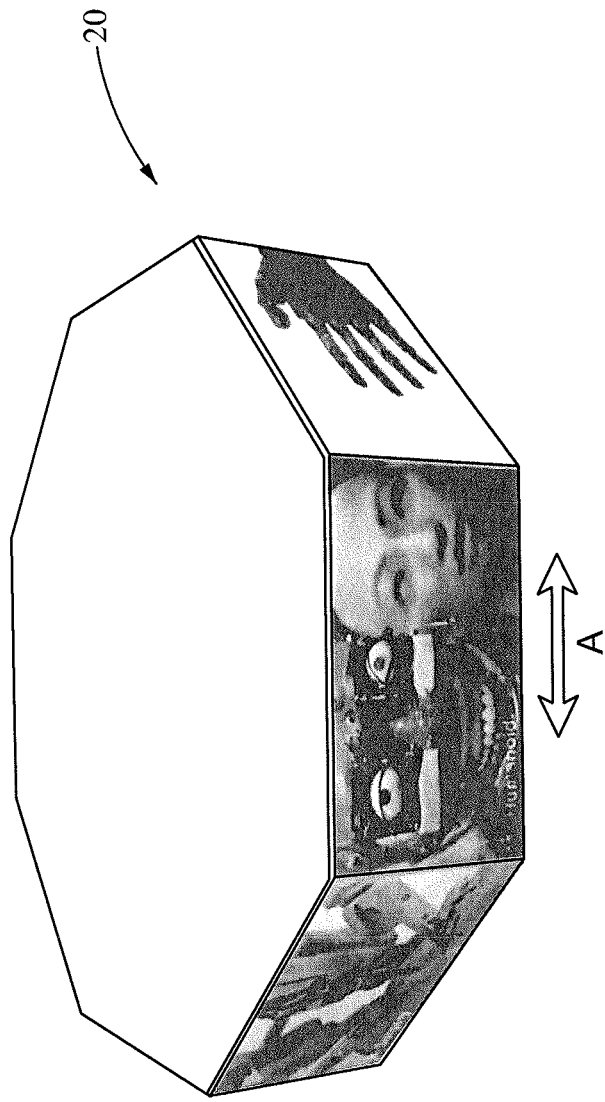
FIG. 2 shows a representative view of how a user may use a side to side interactive motion to change the view of an icon, including which of the various facets appear, and/or control the access/view of a particular facet, for example, such as by using the user's finger to rotate the icon or cause access, in accordance with aspects of the present invention.

A user may change the view of the icon, including which of the various facets appear, or control the access/view of a particular facet, for example, by using the user's finger to rotate the icon or cause access to multimedia information associated therewith as shown in FIG. 2 (directions A show example rotation directions for the icon, which may be implemented, for example, via a side to side sliding touch of the user's finger or other interface mechanism, such as a stylus, or other input feature or method).

Figure 3:
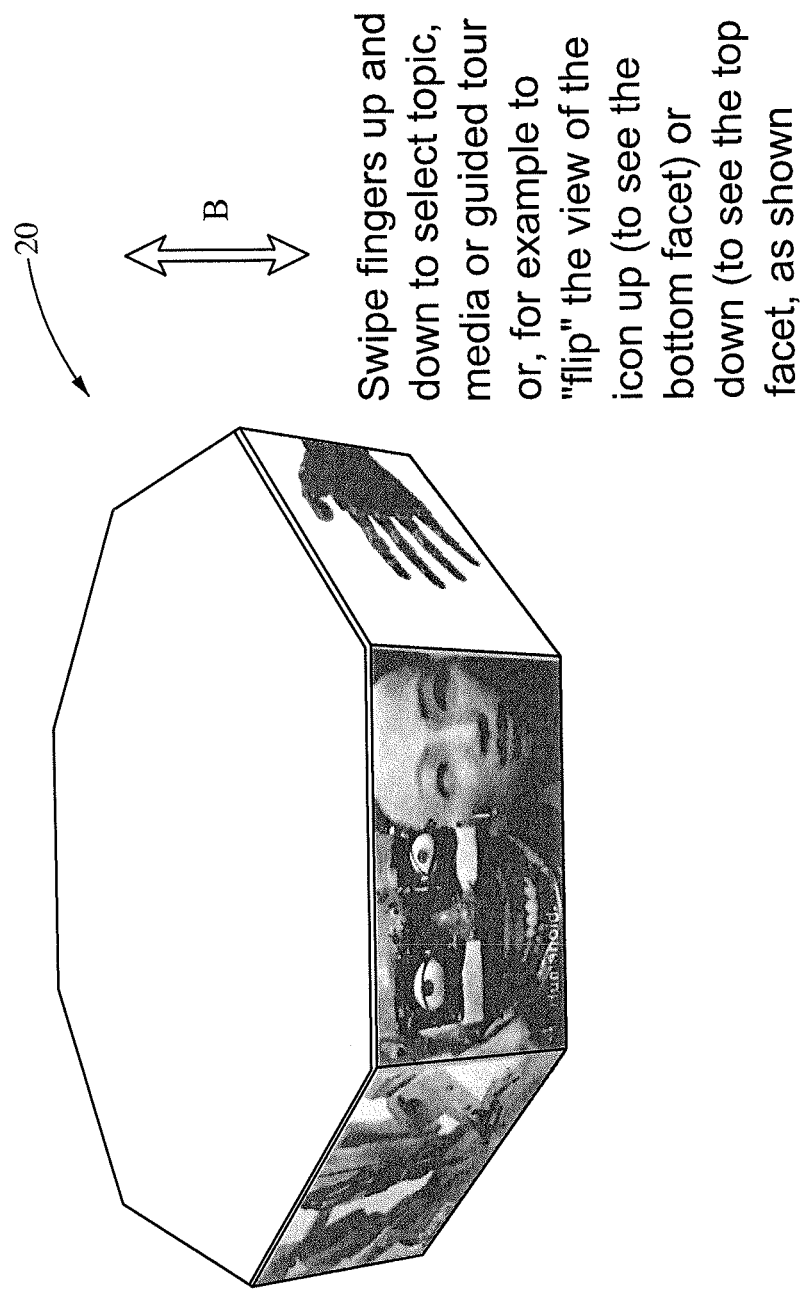
FIG. 3 shows a representative view of how a user may use an up and down interactive motion to allow a change in view of the top and/or bottom facets of the icon, in accordance with aspects of the present invention.

In some variations, such as shown in FIG. 3, the user may use an up and down motion B (e.g., up and down sliding touch of the user's finger) to allow the user to view the top and/or bottom facets of the icon.

As described further below, in other configurations or modes of operation, for example, selection of a particular facet may result in the multifaceted navigational icon changing its number of levels and/or number of facets, or otherwise altering in appearance. In yet other configurations or modes of operation, selection of a particular facet may result in presentation of one or more additional options, such as presenting multiple selectable multimedia presentations, from which the user may then choose or otherwise interact.

In addition to the multifaceted navigational icon, some variations in accordance with aspects of the present invention include additional interaction features, such as menus of words or other selectable features. For example, menu bars may be displayed above or below the multifaceted navigational icon, allowing aspects of the navigational icon to be varied.

Figure 4:
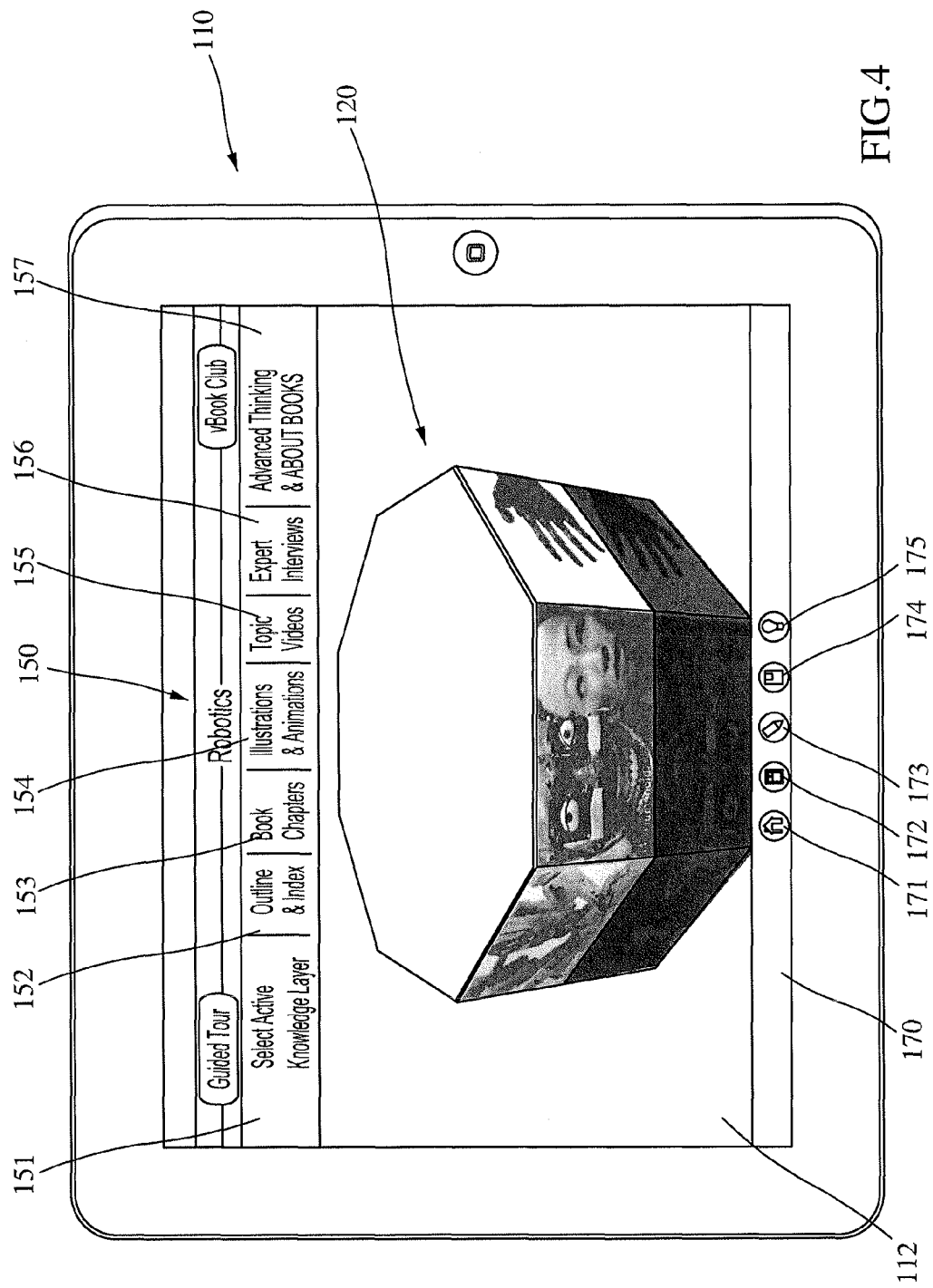
FIG. 4 shows an example view of a three dimensional polyhedron shaped navigational icon displayed on a screen of an example tablet having example menu bars and/or other user interactive features, in accordance with aspects of the present invention.

FIG. 4 shows an example such three dimensional polyhedron shaped navigational icon displayed on a screen of an example tablet having example menu bars and/or other user interactive features, in accordance with aspects of the present invention. As shown in FIG. 4, the tablet 110 has a screen 112, upon which a three dimensional polyhedron shaped navigational icon 120 appears. The icon 120 as shown in FIG. 4, similarly to as shown in FIG. 1, includes a visible top facet and three side facets. In addition to the navigational icon 120, one or more menu bars or other user interactive features 150, 170, may also be displayed on the screen 112.

In some variations, for example, as shown in FIG. 4, selection options may be displayed in a menu 150 either above or below, or left or right of, the multifaceted icon 120, as shown in FIG. 4, and show successive levels of information (e.g., the left-most menu item 151 as displayed on the screen to the user may be the top level folder for a topic area, the next to the right menu item 152 may be a selected sub-folder of the first folder, and so on to successive subfolder levels defining the content displayed on the various sides of the multisided icon and designated by labels 153, 154, 155, 156, 157 in FIG. 4).

According to various aspects, the manner in which a selection is made may also vary depending on how the user interacts or makes a selection. For example, varying taps on a facet may produce different results (e.g., one tap starts the multimedia presentation; two taps produces a pop-up menu of points in the presentation that may be accessed; three taps produces a pop-up menu of the criteria under which the presentation and other presentations at this level are classified). Similarly, the user may access in other ways, such as by touching the facet at certain locations to produce different results, or touching the facet with one, two, or three fingers, to each produce different results.

In yet another variation, selection of a facet (e.g., top facet) may produce a pop-up or pop-out menu, from which the user is able to select additional information or, for example, move up or down folders/subfolders of the contained information. According to various aspects of the current invention, as illustrated in FIG. 5, the display 500 may include a selection menu 510 that may be displayed on the top or bottom facet.

Figure 5:
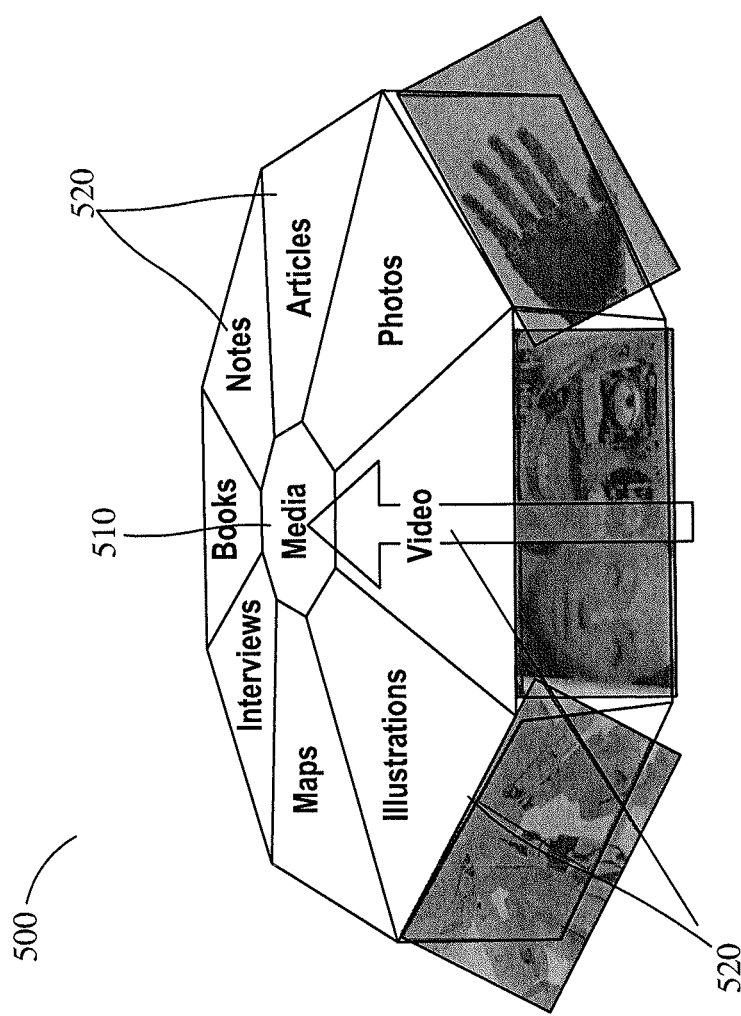
FIG. 5 presents a representative diagram of how an example menu may be displayed as selectable pie-shaped portions of a facet on the bottom or top of an icon, in accordance with aspects of the present invention.
Figure 6:
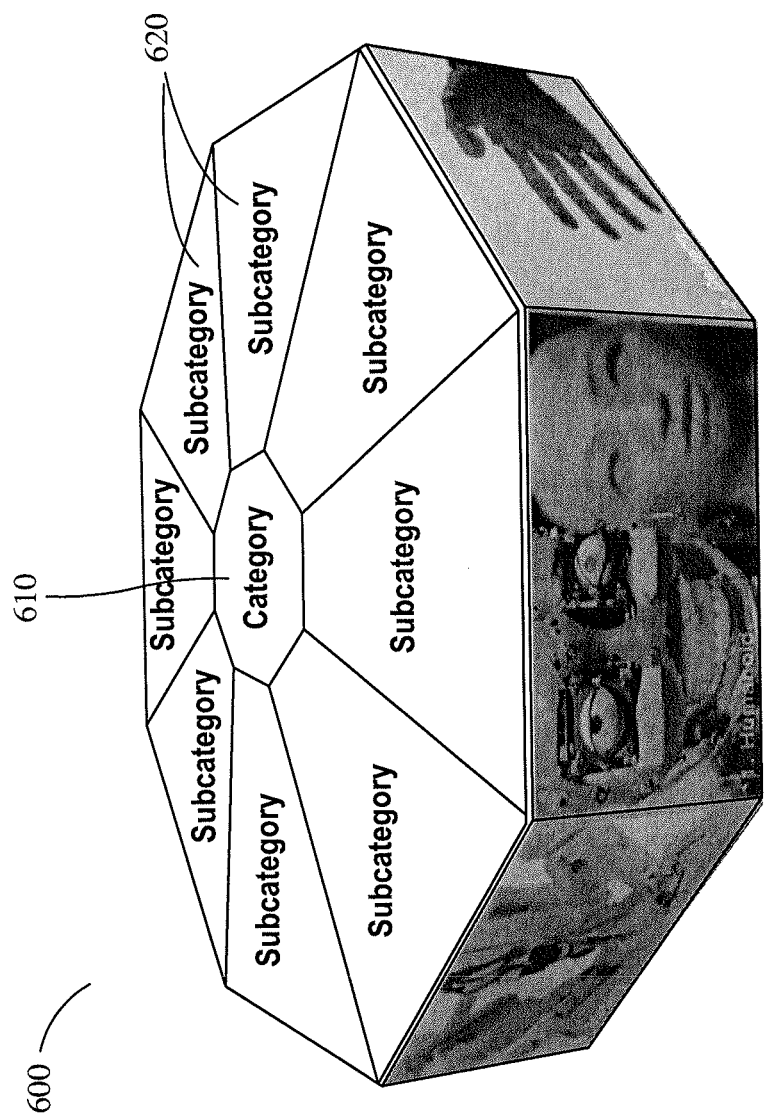
FIGS. 6 and 7 show example organization level views of pie-shaped menus displayed for a top facet, in accordance with aspects of the present invention.
Figure 7:
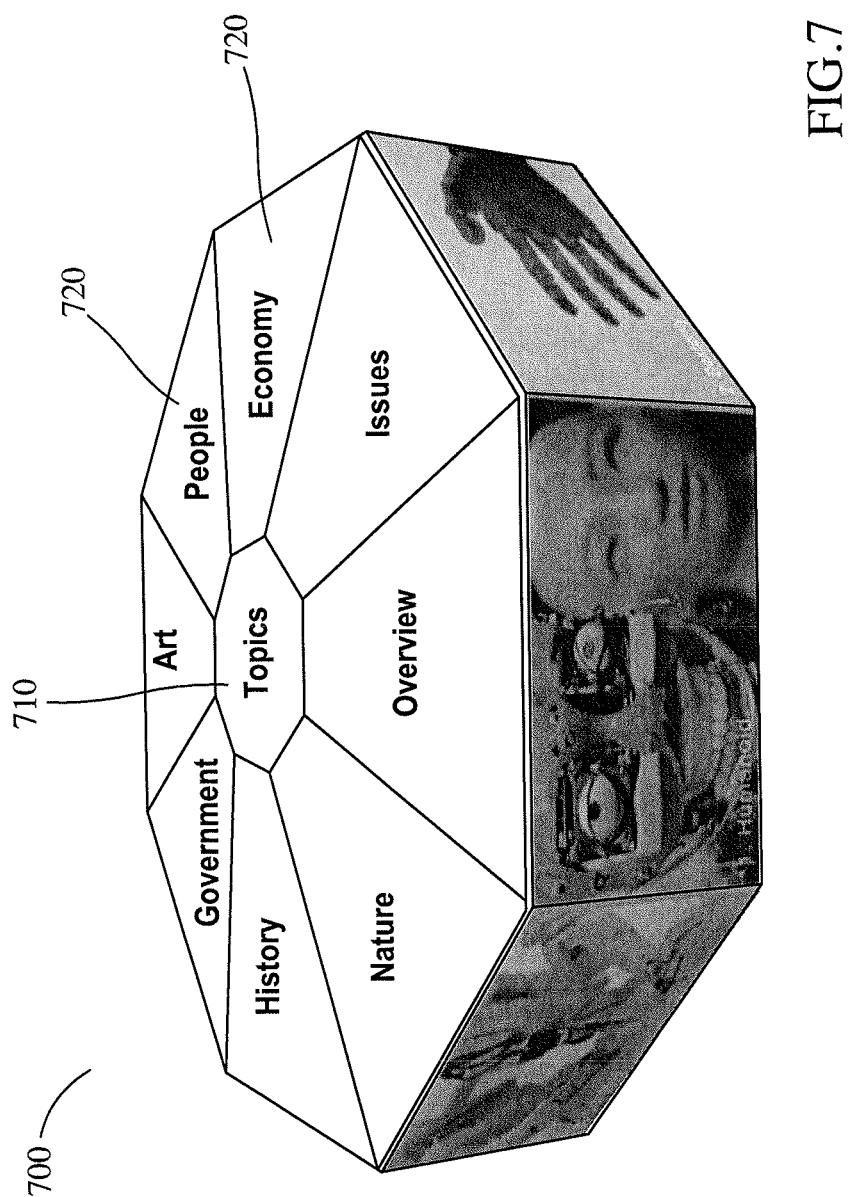

Accordingly, a selection of the menu 510 by a user, for example by applying the user's finger on the location of the menu 510 on the screen may result in the submenus 520 to be displayed as pie slices around the menu 510 (e.g., the menu may be displayed as selectable pie-shaped portions of the facet on the bottom or top, as shown in FIG. 5). FIGS. 6 and 7 show example organization level views of displays 600 and 700 having a menu 610 and 720 and a plurality of sub-menus 620 and 720, the sub-menus being in a pie-shaped configuration with the menu 620 and 710 at the center of the pie. The examples illustrated are displayed for a top facet, in accordance with aspects of the present invention, but may also be displayed for a bottom facet.

Other menus or selection options may similarly be displayed. For example, returning to FIG. 4, the bottom menu 170 may be displayed to allow high level navigation of the icon (e.g., "home" selection 171 may return the user to a base level view of the icon 120, and other selections labeled 172, 173). For example, selection 174 may refer to the option of saving data to a memory, and selection 175 may refer to a help feature.

Figure 8:
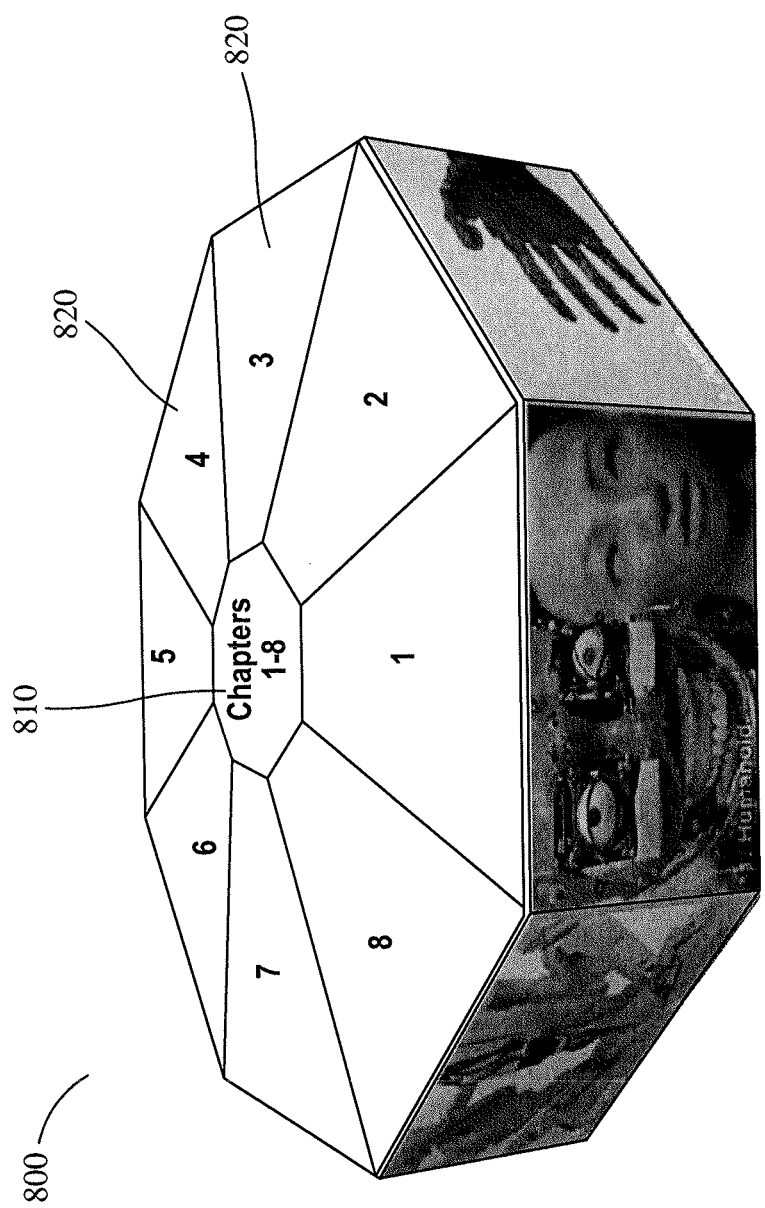
FIG. 8 presents a representative view of example menu items that are chapters of a book, in which the facets of the multifaceted icon contain various portions of the contents of that book and/or other elements of multimedia information, in accordance with aspects of the present invention.

In one example in accordance with aspects of the present invention, as shown in FIG. 8, the display 800 may include a menu 810 representing a book, where the menu may include one or more chapters of a book, and the sub-menu items 820 may correspond to chapters of the book, where the facets of the multifaceted icon may contain various portions of the contents of that book or other elements of multimedia information. For example, the facet corresponding to chapter 1 may display a photograph or drawing representative of the chapter, or the first page of the chapter, or the like.

The information displayed in the facets at any given time may vary, depending on the level of viewing and type of information provided. For example, for video information selections, a still shot of a video and/or title information for the video may be displayed in the facet. For an electronic book, the titles of each chapter may be displayed in the facets.

Figure 9:
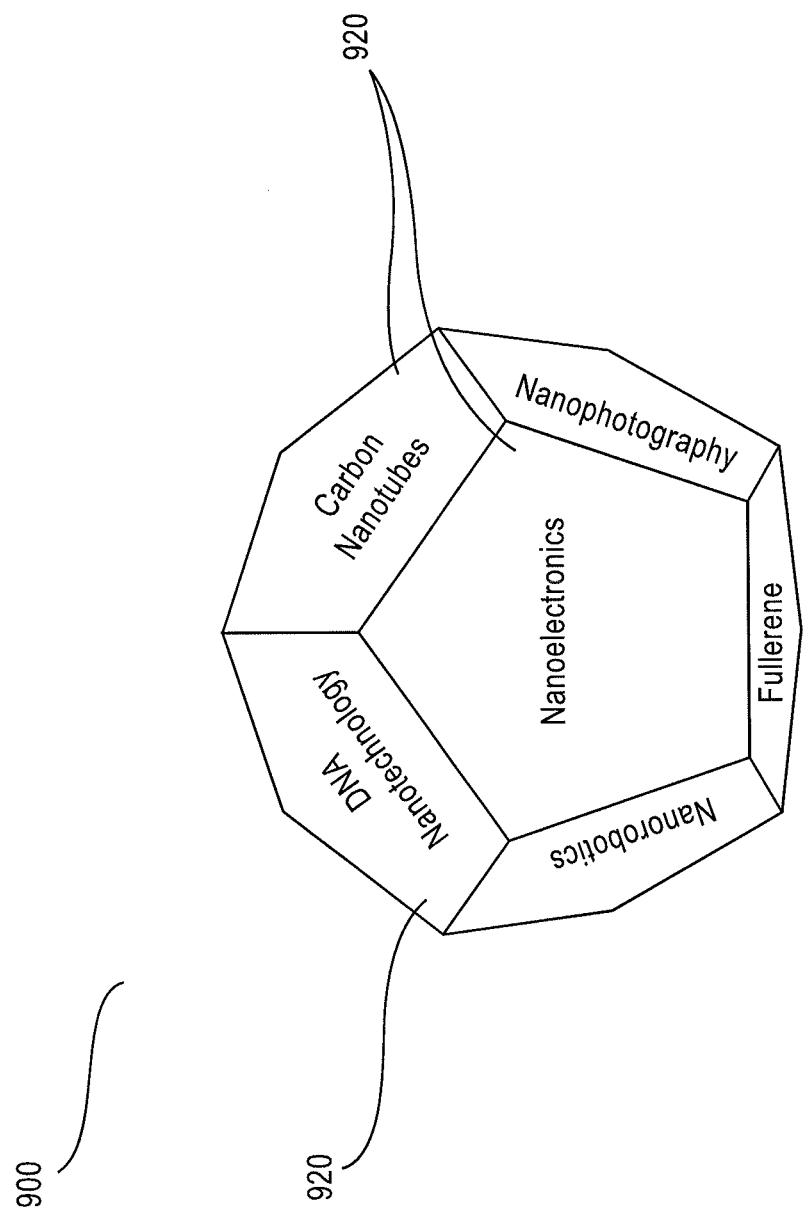
FIG. 9 shows a representative view of an example multifaceted icon relating to nanotechnology, in accordance with aspects of the present invention.
Figure 10:
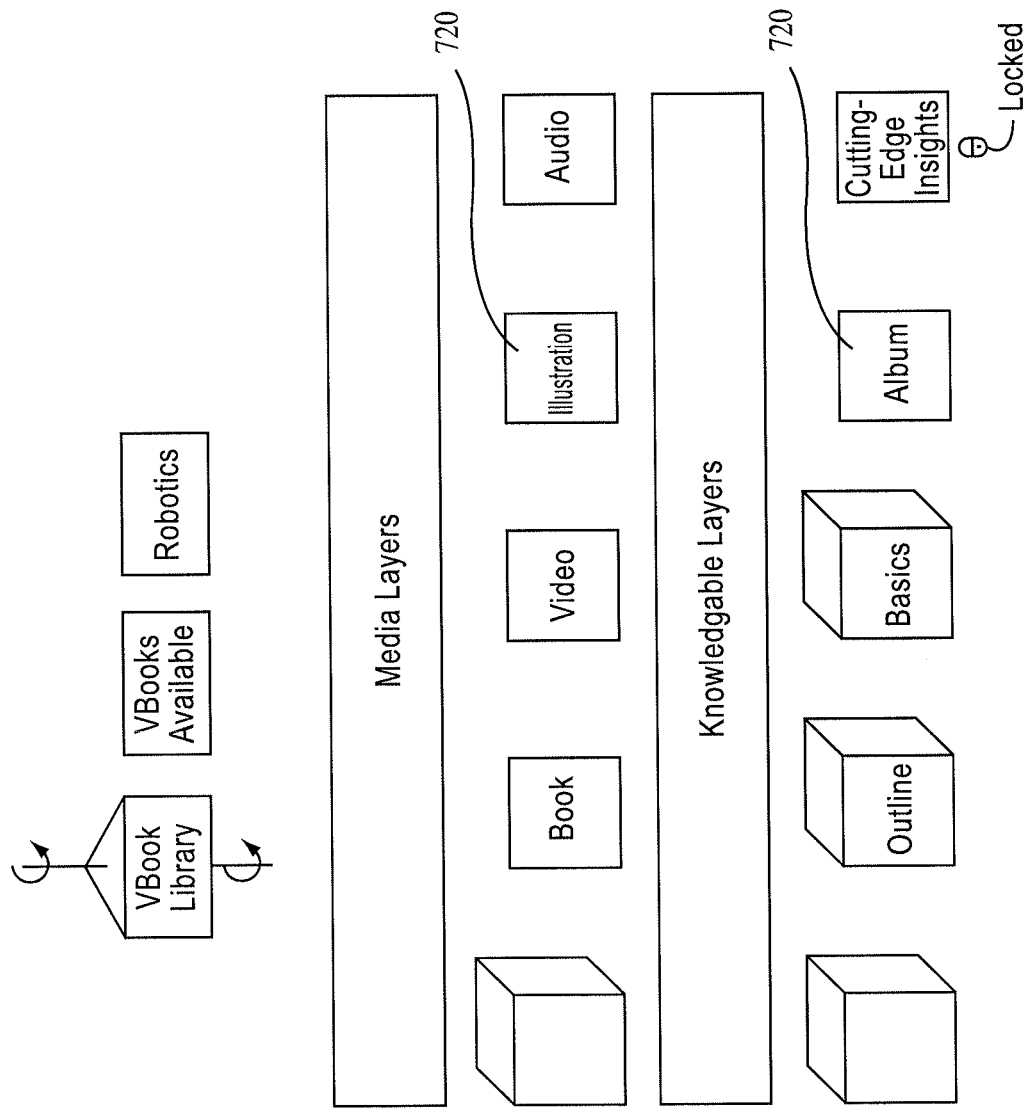
FIG. 10 shows representative views of how an example icon could allow an example virtual book to be organized, in accordance with aspects of the present invention.
Figure 10:
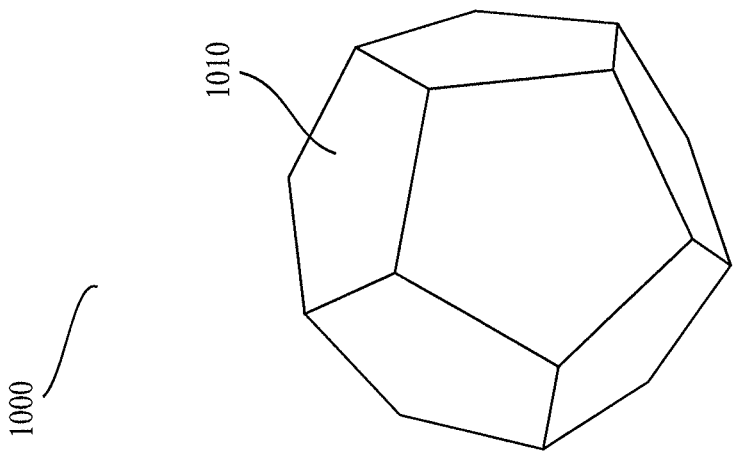
Figure 11:
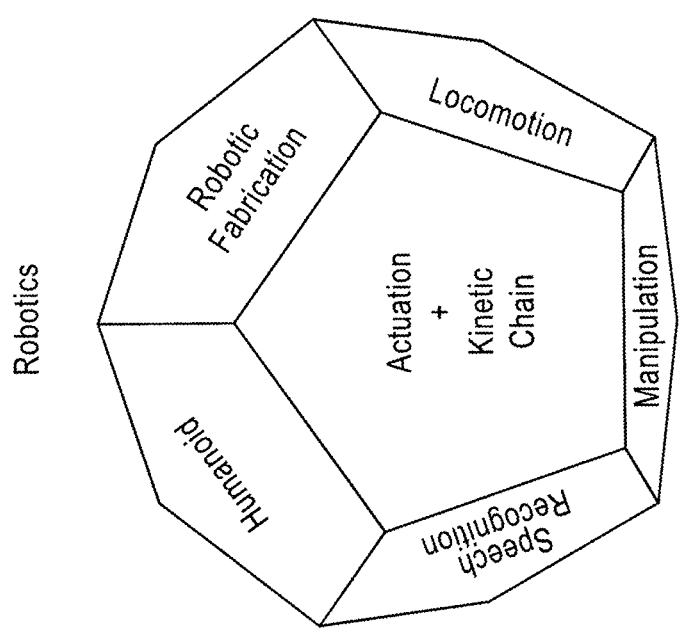
FIGS. 11-14 show other examples of multifaceted icons for virtual books on robotics, the quantum world, understanding the universe, and China, in accordance with aspects of the present invention.
Figure 12:
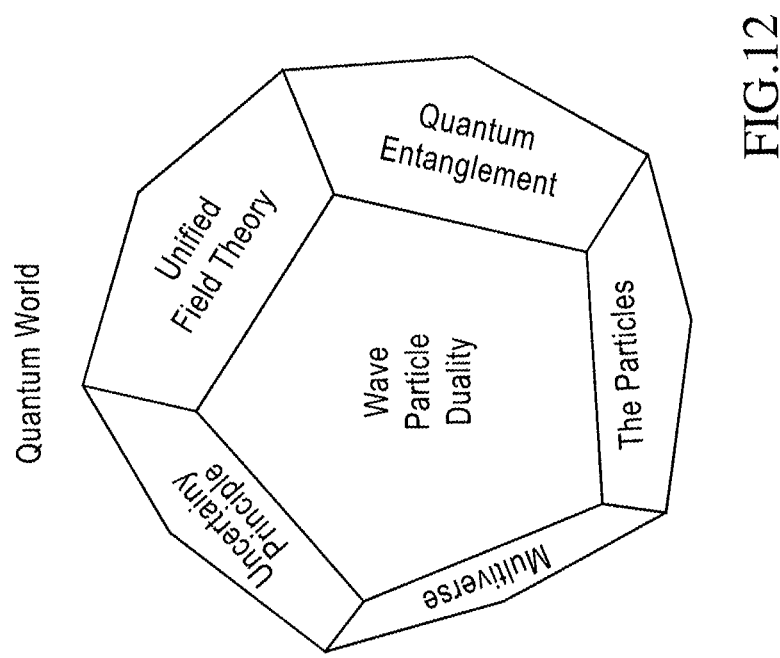
Figure 13:
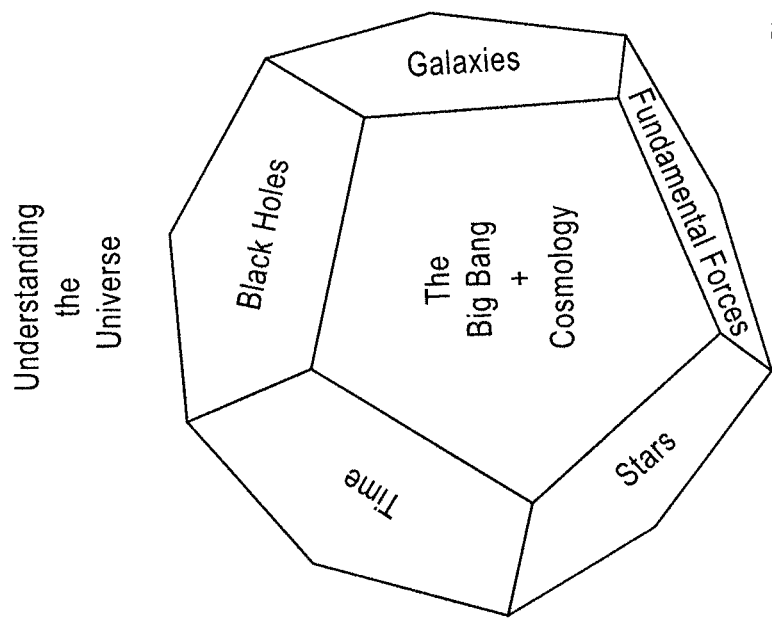
Figure 14:
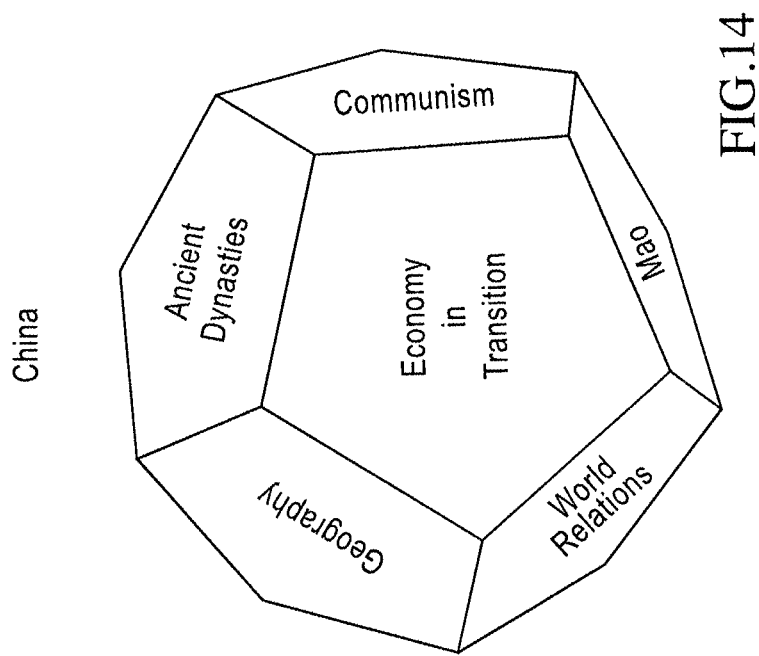

In one example of an application of the multifaceted icon in accordance with aspects of the present invention, as shown in the representative images in FIGS. 9-14, information for a virtual book application is organized and accessed via the icon. According to various aspects, FIG. 9 illustrates a representative view of an example multifaceted icon 900 representing a book related to nanotechnology, where the various facets 920 represent, for example, individual chapters, or groups of pages of the book 900. FIG. 10 shows representative views of how the icon 1000 could allow the virtual book to be organized in various ways. For example, the facet 1010 may represent a higher level media layer or a higher level knowledge layer. If the facet 1010 represents a media layer, then when the facet 1010 is urged by, for example, the user's finger, lower level media layers 720 may be displayed on the remaining facets of the polyhedron. Alternatively, if the facet 1010 represents a knowledge layer, for example, then when the facet 1010 is urged by the user's finger or other mechanism or input, lower level knowledge layers 720 such as, e.g., chapters of a book or book titles within a book library, may be displayed on the remaining facets of the polyhedron.

Figure 15:
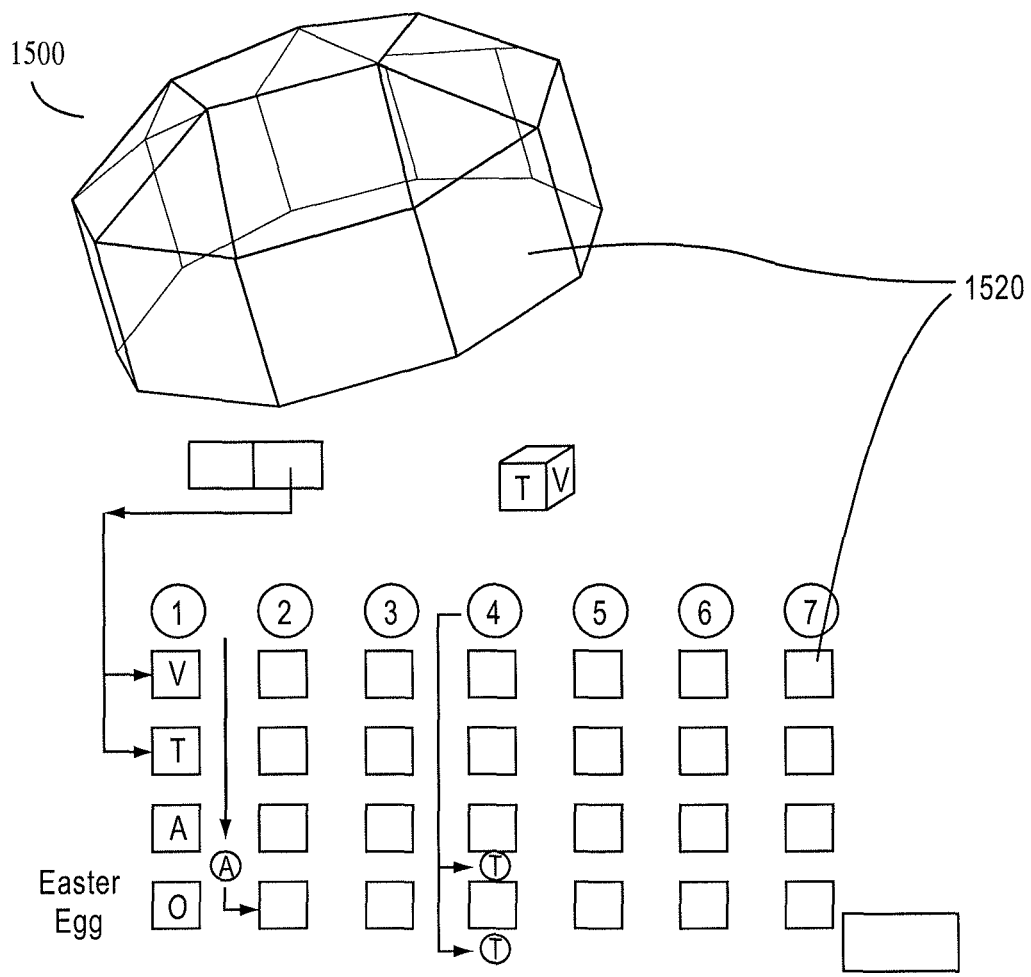
FIG. 15 shows representative diagrams and images of an example multifaceted icon having multiple layers of data, variably accessible via various facets and other features, in accordance with aspects of the present invention.

FIGS. 11-14 illustrate other examples of multifaceted icons for virtual books on robotics, the quantum world, understanding the universe, and China. According to various aspects of the current invention, each facet of polyhedron may represent a chapter of the book, or a group of pages of the book. FIG. 15 shows representative diagrams and images of an example multifaceted icon 1500 having multiple layers of data 1520, variably accessible via various facets and/or other features.

In another example of an application of the multifaceted icon, the information displayed in the facets may correspond to information in a video library, and the icon may be used to organize and access the video library. For example, the user may classify the video by certain criteria (e.g., video genre, such as drama, comedy, science fiction, mystery), and one level of facets may contain each of these criteria. Once a criterion facet is selected, a new set of facets or an altered icon may appear, containing additional facets, each presenting a different video within that criterion group (e.g., the title and/or a still shot from the video). Thus, the icon may provide a navigation mechanism for accessing video information in this example.

In another example in accordance with aspects of the present invention, additional information (e.g., new facets displayed on the icon) may occur as a result of certain conditions being met. For example, if a facet provides a series of informational presentations followed by questions the user answers, additional facets may be displayed from the top of the icon upon the user answering a sufficiently high percentage of the questions (e.g., 70%). The user would thus experience increased levels of information as the user progressed in learning from the presentation.

Similarly, in another example, if the presentation is a story or a game having differing outcomes depending on user selections, at certain points in the story/game, the user may be presented with selection options for proceeding to the next phase of the story/game, and the resulting experience would be driven by the user's choices among those options.

In some variations, rather than pop-up menus or additional facets being displayed, additional multifaceted icons may appear. For example, a first polyhedron may be rotated or otherwise viewed by the user, and upon the user selecting a facet of the polyhedron, another polyhedron may appear, extending from the selected facet, somewhat analogous, for example, to a subfolder containing additional files/folders that is displayed when a parent folder in a list of folders is accessed in a conventional PC electronic file organization (e.g., folders and files on a computer drive). According to various aspects, the second, extending polyhedron may independently be rotated and its facets viewed and accessed by, for example, a user selecting a facet with a finger.

Besides accessing information, the multifaceted icon may also be used for other purposes, such as to selectively control operation of external devices (e.g., facets correspond to various household devices, such as televisions and CD players, and selection of a facet corresponding to the item would allow the item to then be controlled via control functions displayed for the selected facet). Such control may be carried out, for example, by combining the interface with an emitting control function (e.g., a universal remote control device that emits infrared, radiofrequency, or other signals that allow control of receiving devices).

In another example application, the icon interface may be used within a network (e.g., the Internet) for record retrieval or other interaction. For example, a patient may access some or all of that patient's medical information, which may be located at multiple remote locations, and/or obtain related information or services, such as diagnostic advice or billing and insurance records. The medical records may be organized by body part, for example, and the multifaceted interface may have facets corresponding to each body part. Similarly, a user may organize and access disparate and scattered financial information.

Figure 16:
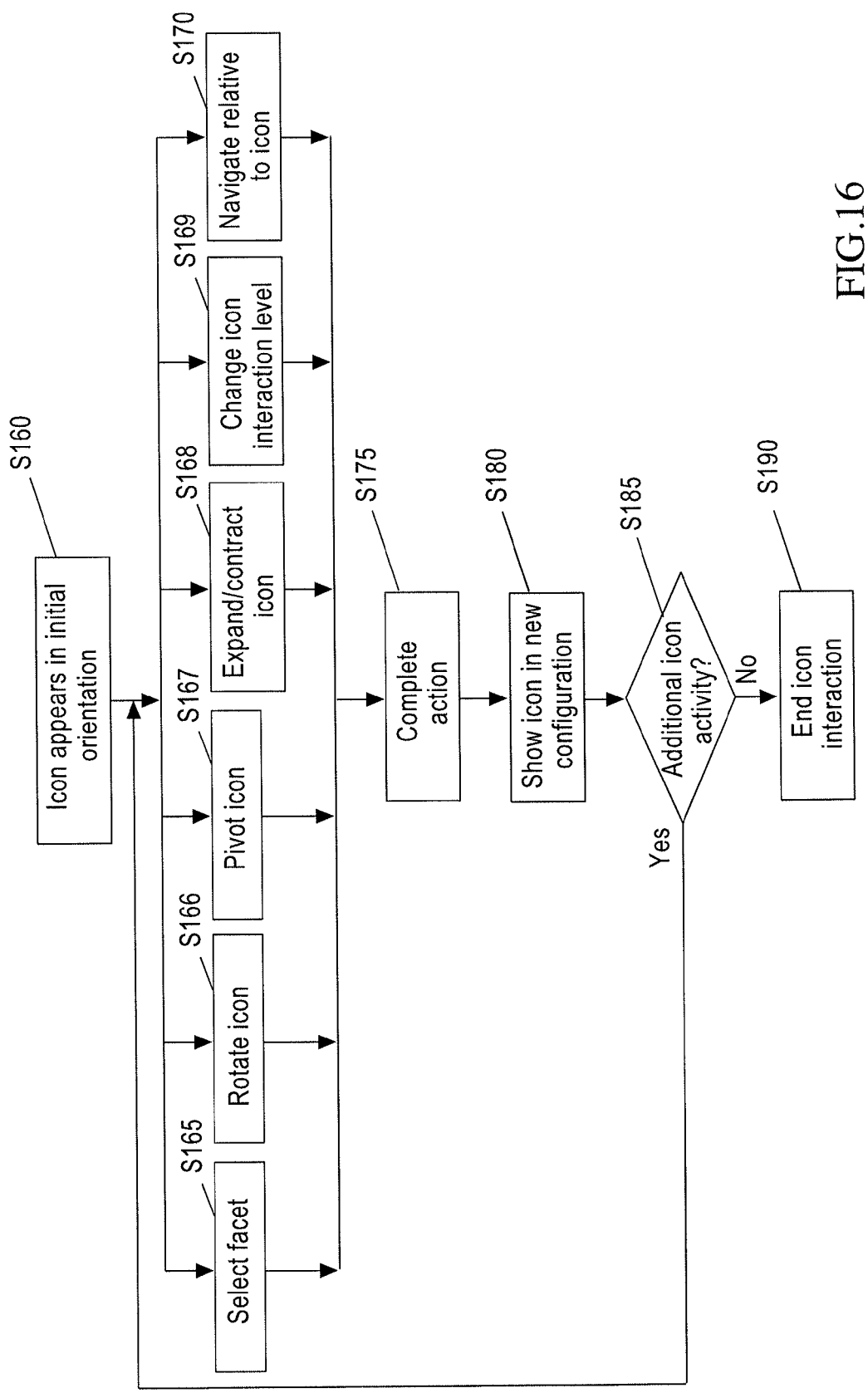
FIG. 16 shows a representative diagram of an example flow chart for use of a multifaceted icon-based navigational system in accordance with aspects of the present invention.

FIG. 16 shows a representative diagram of an example flow chart for use of an icon-based navigational system in accordance with aspects of the present invention. As shown in FIG.

16, in operation, a multifaceted navigational icon may first be displayed in an initial orientation S160. The user may then have several options for actions to perform using the navigational icon and/or one or more menus associated with the navigational icon, including: selecting a facet S165 (e.g., touching a facet, resulting in the facet producing an associated activity, such as playing a multimedia presentation or opening a folder); rotating the icon S166 (e.g., by the user sliding a finger on the screen in a direction of rotation of the icon); pivoting the icon S167 (e.g., by the user sliding a finger in an up or down motion on the screen); expanding and/or contracting the icon S168 (e.g., by selection of one or more facets to expand/contract the icon, such as may be possible using a top or bottom end facet, for example); changing the icon interaction level S169 (e.g., selecting a menu location that changes the level of interaction of the icon); and navigating relative to the icon S170 (e.g., selecting a menu item to go to a home or other position, or take other action relative to the icon).

The selected action may then be carried out at S175, and the icon thus presented in the new configuration or other activity taking place at S180, based on the selected action. Additional icon activity may then be performed at S185, including each of the selection options S165-S170. When all icon activity is completed, the icon interaction may end at S190.

Figure 17:
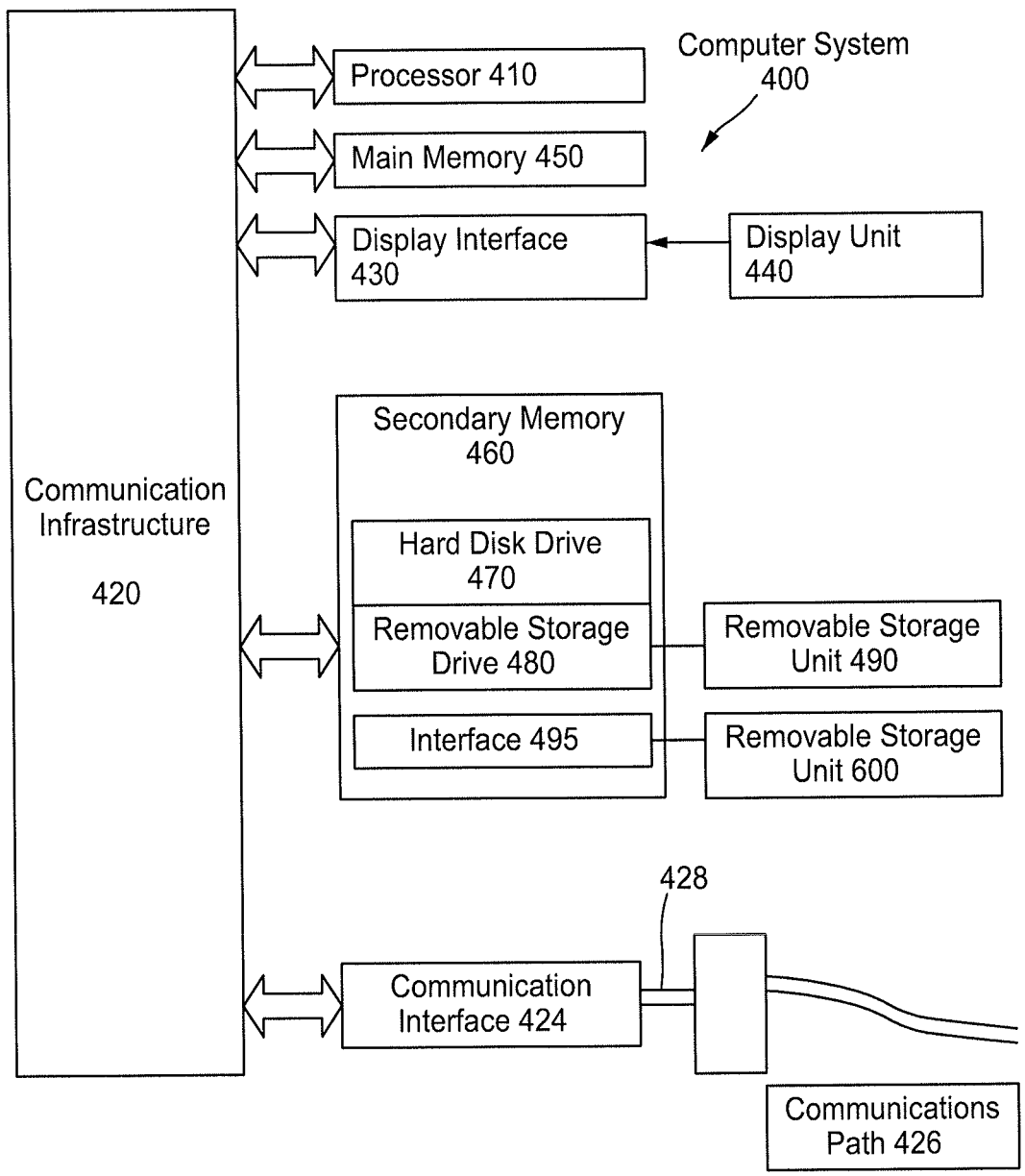
FIG. 17 contains a representative diagram of an example computer system capable of carrying out functionality described in example implementations in accordance with aspects of the present invention.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 400 is shown in FIG. 17.

Computer system 400 includes one or more processors, such as processor 404. The processor 410 is coupled to a communication infrastructure 420 (e.g., a communications bus, cross-over bar, or network). Various software aspects are described in terms of this example computer system. After reading this description, it will become apparent to a person skilled in the relevant art(s) how to implement aspects hereof using other computer systems and/or architectures.

Computer system 400 may include a display interface 430 that forwards graphics, text, and other data from the communication infrastructure 420 (or from a frame buffer not shown) for display on a display unit 440. Computer system 400 may include a main memory 450, preferably random access memory (RAM), and may also include a secondary memory 460. The secondary memory 460 may include, for example, a hard disk drive 470 and/or a removable storage drive 480, representing a floppy disk drive, a magnetic tape drive, an optical disk drive, etc. The removable storage drive 480 may read from and/or write to a removable storage unit 490 in a well-known manner. Removable storage unit 490, represents a floppy disk, magnetic tape, optical disk, etc., which may be read by and written to removable storage drive 480. As will be appreciated, the removable storage unit 418 may include a computer usable storage medium having stored therein computer software and/or data.

Alternative aspects of the present invention may include secondary memory 460 and may include other similar devices for allowing computer programs or other instructions to be loaded into computer system 400. Such devices may include, for example, a removable storage unit 490 and an interface 495. Examples of such may include a program cartridge and cartridge interface (such as that found in video game devices), a removable memory chip (such as an erasable programmable read only memory (EPROM), or programmable read only memory (PROM)) and associated socket, and other removable storage units 490 and interfaces 495, which allow software and data to be transferred from the removable storage unit 490 to computer system 400.

Computer system 400 may also include a communications interface 424. Communications interface 424 may allow software and data to be transferred among computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 may be in the form of signals 428 which may be electronic, electromagnetic, optical or other signals capable of being received by communications interface 424. These signals 428 may be provided to communications interface 424 via a communications path (e.g., channel) 426. This path 426 may carry signals 428 and may be implemented using wire or cable, fiber optics, a telephone line, a cellular link, a radio frequency (RF) link and/or other communications channels. As used herein, the terms "computer program medium" and "computer usable medium" refer generally to media such as a removable storage drive 480, a hard disk installed in hard disk drive 470, and/or signals 428. These computer program products may provide software to the computer system 400. Aspects of the present invention are directed to such computer program products.

Computer programs (also referred to as computer control logic) may be stored in main memory 450 and/or secondary memory 460. Computer programs may also be received via communications interface 424. Such computer programs, when executed, may enable the computer system 400 to perform the features in accordance with aspects of the present invention, as discussed herein. In particular, the computer programs, when executed, may enable the processor 410 to perform the features in accordance with aspects of the present invention. Accordingly, such computer programs may represent controllers of the computer system 400.

Where aspects of the present invention may be implemented using software, the software may be stored in a computer program product and loaded into computer system 400 using removable storage drive 414, hard drive 412, or communications interface 420. The control logic (software), when executed by the processor 404, may cause the processor 404 to perform the functions described herein. In another aspect of the present invention, the system may be implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the present invention may be implemented using a combination of both hardware and software.

Figure 18:
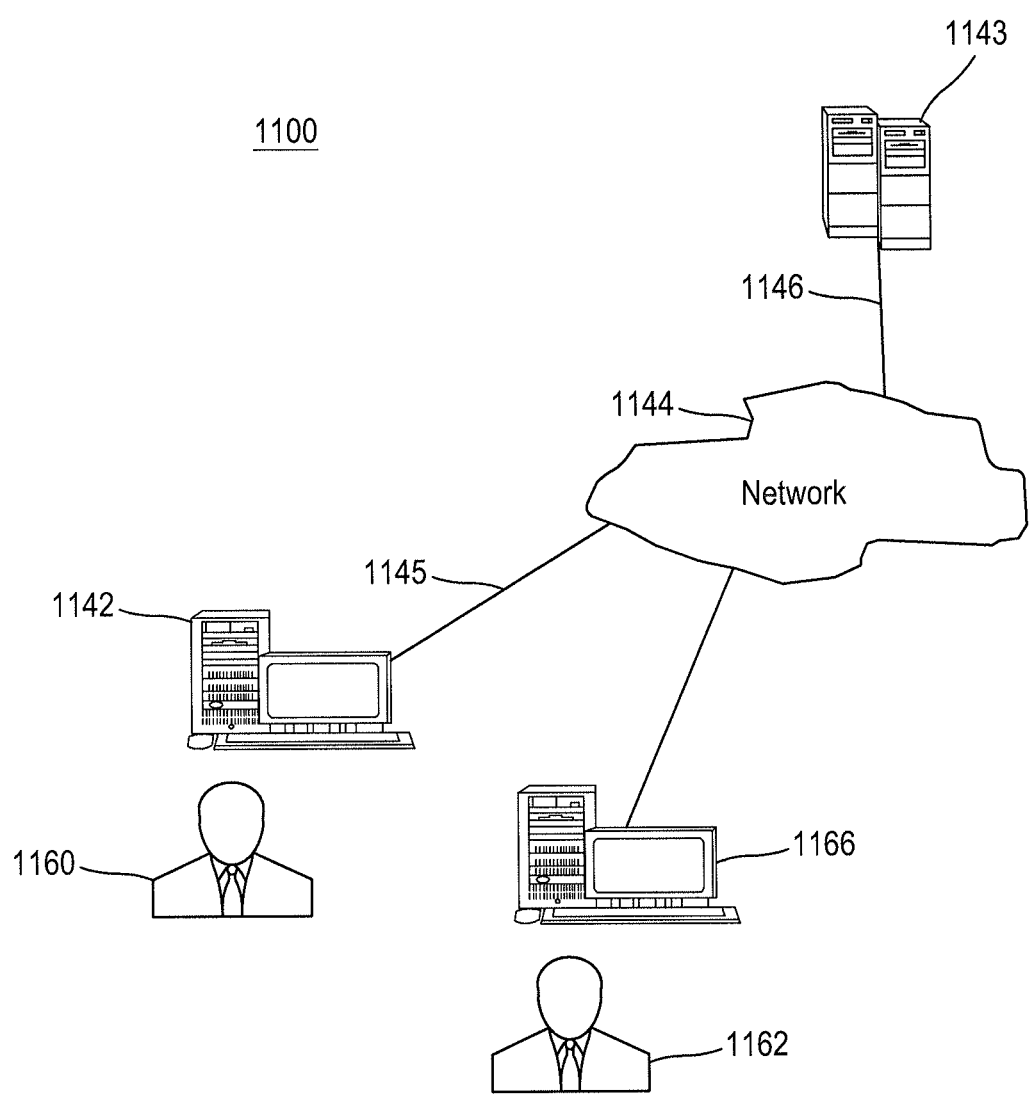
FIG. 18 is a block diagram of various exemplary system components, in accordance with an aspect of the present invention.

FIG. 18 is a block diagram of various exemplary system components, in accordance with an aspect of the present invention. FIG. 18 shows a communication system 1100 usable in accordance with the present invention. The communication system 1100 includes one or more accessors 1160, 1162 (also referred to interchangeably herein as one or more "users") and one or more terminals 1142, 1166. In one aspect, data for use in accordance with the present invention is, for example, input and/or accessed by accessors 1160, 1162 via terminals 1142, 1166, such as personal computers (PCs), minicomputers, mainframe computers, microcomputers, telephonic devices, or wireless devices, such as personal digital assistants ("PDAs"), smart phones, or other hand-held wireless devices coupled to a server 1143, such as a PC, minicomputer, mainframe computer, microcomputer, or other device having a processor and a repository for data and/or connection to a repository for data, via, for example, a network 1144, such as the Internet or an intranet, and couplings 1145, 1146, 1164. The couplings 1145, 1146, 1164 include, for example, wired, wireless, or fiberoptic links. In another variation, the method and system in accordance with aspects of the present invention operate in a stand-alone environment, such as on a single terminal.

Figure 19:
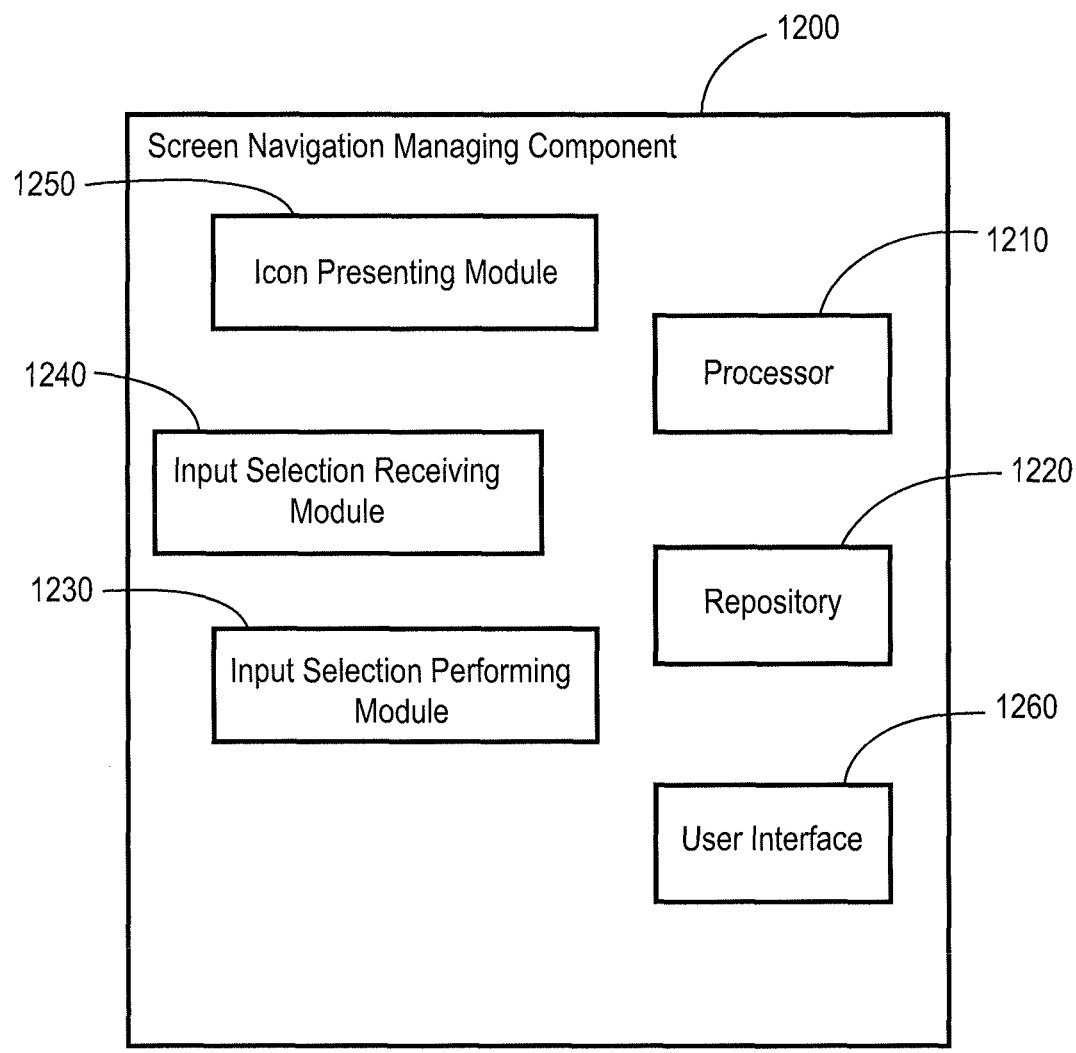
FIG. 19 is a diagram of screen navigation managing component in accordance with an aspect of the present invention.

FIG. 19 is a diagram of screen navigation managing component in accordance with an aspect of the present invention. According to various aspects, the screen navigation managing component 1200 may include a processor 1210, a repository 1220 and a user interface 1260, and may also include an icon presenting module 1250, an input selection receiving module 1240 and an input selection performing module 1230.

While aspects of this invention have been described in conjunction with the exemplary features outlined above, various alternatives, modifications, variations, improvements, and/or substantial equivalents, whether known or that are or may be presently unforeseen, may become apparent to those having at least ordinary skill in the art. Accordingly, the exemplary aspects of the invention, as set forth above, are intended to be illustrative, not limiting. Various changes may be made without departing from the spirit and scope hereof. Therefore, aspects of the invention are intended to embrace all known or later-developed alternatives, modifications, variations, improvements, and/or substantial equivalents.

What is claimed:

1. A three dimensional interactive navigational screen icon for use with a device having a processor and a screen display, the interactive navigational screen icon comprising:
    a plurality of facets, each of the plurality of facets being selectable via touch of the screen display, the plurality of facets comprising top, bottom and side facets, arranged about at least one perimeter aspect of the icon, at least one of the plurality of facets providing a viewable and selectable image, each of the plurality of facets having a variable size, the variable size depending upon position, wherein when the variable size is larger for one of the plurality of facets, the larger facet enhances touch selection and viewing relative to each of the plurality of facets for which the variable size is smaller;
    the plurality of facets being arranged such that at least one border of each facet is contiguous with at least one border of another facet;
    wherein the plurality of facets form an icon that is at least one of slidable and rotatable to display one or more of the plurality of facets;
    wherein at least one top facet displays a menu, wherein the top facet is divided into the menu and a plurality of sub-menus around the menu for selection by a user, each sub-menu corresponding to a respective side facet, wherein at least one of the respective side facet displays multimedia content related to the corresponding sub-menu; and
    wherein selection of the at least one of the plurality of facets provides access, via the processor, to information associated therewith.

2. The screen icon of claim 1, wherein:
    the plurality of facets form a polyhedron; and
    each of the plurality of facets constitute a two-dimensional portion of the polyhedron.

3. The screen icon of claim 1, wherein the facets are displayed on a screen of at least one of a computer, a personal digital assistant and a smart device.

4. The screen icon of claim 1, wherein at least one end facet is viewable and selectable to perform at least one from a group consisting of:
    providing a viewable and selectable image to provide access to information associated therewith;
    providing a partitioned image having separately selectable partition sections, to provide varying selection options for additional facets; and
    providing expansion options for the icon.

5. The screen icon of claim 1, wherein the selection of the at least one of the plurality of facets results in a display of one selected from a group consisting of a new window, a pop-up window, and a secondary multifaceted three-dimensional icon, the selection providing data associated with the selected facet.

6. The screen icon of claim 5, wherein:
    the selection of a facet is performed by a user urging the facet; and
    the display of one selected from a group consisting of a new window, a pop-up window, and a secondary multifaceted three-dimensional icon is determined by a frequency at which the facet is urged by the user.

7. The screen icon of claim 1, wherein one or more menus may be displayed on the screen upon selection of the at least one of the plurality of facets.

8. The screen icon of claim 1, wherein the selection of the at least one of the plurality of facets comprises rotating the screen icon to display the selected facet at a central portion of the screen.

9. The screen icon of claim 1, wherein:
    at least one of the plurality of facets comprises high-level data; and
    the selection of the at least one of the plurality of facets results in a display of lower-level data related to the high-level data.

10. The screen icon of claim 1, wherein one or more of the plurality of facets are configured to control one or more external devices.

11. The screen icon of claim 10, wherein the one or more external devices comprise one or more selected of a group consisting of household devices and audio/visual devices.

12. The screen icon of claim 1, wherein when one of the plurality of facets provides one or more presentations having questions, additional facets are displayed upon a user answering a percentage of the questions correctly.

13. The screen icon of claim 12, wherein one or more selection options are displayed to the user to allow the user to proceed to a later stage on a presentation.

14. The screen icon of claim 1, wherein information displayed in the facets varies based on a type of information provided and a level of viewing.

15. The screen icon of claim 1, wherein the plurality of sub-menus are displayed as pie slices around the menu.

16. A method of screen navigation on a device having a processor and a screen using a three dimensional interactive screen icon having a plurality of facets, each of the plurality of facets being selectable via touch of the screen, the plurality of facets being arranged such that at least one border of each facet is shared with at least one border of another facet, the method comprising:
    presenting the icon in a first orientation, wherein a top facet of the plurality of facets displays a menu and a plurality of sub-menus around the menu, each sub-menu corresponding to a respective side facet, wherein at least one of the respective side facet displays multimedia content related to the sub-menu, wherein each of the plurality of facets have a variable size, the variable size depending upon position, wherein when the variable size is larger for one of the plurality of facets, the larger facet enhances touch selection and viewing relative to each of the plurality of facets for which the variable size is smaller;

receiving an input selection, the input selection being selected from a group consisting of selecting a facet of the icon, rotating the icon, pivoting the icon, expanding or contracting the icon, varying the icon interaction level, moving the icon in a direction, selecting the menu, selecting one or more of the plurality of sub-menus, and navigating relative to the icon, wherein the input selection is selected based on a manner in which a user makes the input selection; and performing the received input selection, the performing including performing a computer function via the processor.

17. The method of claim 16, wherein performing the received input selection comprises displaying at least one selected from a group consisting of another facet, a display window, a pop-up window, and a secondary multifaceted three-dimensional icon.

18. The method of claim 17, wherein:
receiving the input selection is performed by a user urging the facet; and
displaying one selected from a group consisting of another facet, a display window, a pop-up window, and a secondary multifaceted three-dimensional icon based on a frequency at which the facet is urged by the user.

19. The method of claim 16, wherein performing the received input selection comprises at least one of:
providing a viewable and selectable image to provide access to information associated therewith;
providing a partitioned image having separately selectable partition sections, to provide varying selection options for additional facets; and
providing expansion options for the icon.

20. The method of claim 16, wherein:
at least one of the plurality of facets comprises high-level data; and
performing the received input selection comprises displaying lower-level data related to the high-level data.

21. The method of claim 16, wherein the input selection comprises one or more of varying taps on the facet and touching the facet with a different number of fingers to each produce different results.

22. A system for screen navigation using a three dimensional interactive screen icon having a plurality of facets, each of the plurality of facets being selectable via touch of the screen, the plurality of facets being arranged such that all borders of each facet are shared with other facets, the system comprising:
a processor;
a user interface functioning via the processor; and
a repository accessible by the processor;
wherein the processor, user interface, and repository are configured to interoperate such that:
the icon is presented in a first orientation, wherein a top facet of the plurality of facets displays a menu and a plurality of sub-menus around the menu, each sub-menu corresponding to a respective side facet, wherein at least one of the respective side facet displays multimedia content related to the sub-menu, wherein each of the plurality of facets have a variable size, the variable size depending upon position, wherein when the variable size is larger for one of the plurality of facets, the larger facet enhances touch selection and viewing relative to each of the plurality of facets for which the variable size is smaller;
an input selection is received, the input selection being selected from a group consisting of selecting a facet, rotating the icon, pivoting the icon, expanding or contracting the icon, varying the icon interaction level, selecting the menu, selecting one or more of the plurality of sub-menus, and navigating relative to the icon, wherein the input selection is selected based on a manner in which a user makes the input selection; and
the received input selection is performed, the performed input selection comprising a computer operation.

23. The system of claim 22, wherein:
the processor is housed on a terminal selected from a group consisting of a personal computer, a minicomputer, a main frame computer, a microcomputer, a hand held device, and a telephonic device; and
the processor is coupled to a server; and
the server is coupled to a network.

24. A computer program product comprising a non-transitory computer usable medium having control logic stored therein for causing a computer to perform screen navigation using a three dimensional interactive screen icon having a plurality of facets, each of the plurality of facets being selectable via touch of the screen, the plurality of facets being arranged such that at least one border of each facet is contiguous with at least one border of another facet, the control logic comprising:
computer readable program code means for presenting the icon in a first orientation, wherein a top facet of the plurality of facets displays a menu and a plurality of sub-menus around the menu, each sub-menu corresponding to a respective side facet, wherein at least one of the respective side facet displays multimedia content related to the sub-menu, wherein each of the plurality of facets have a variable size, the variable size depending upon position, wherein when the variable size is larger for one of the plurality of facets, the larger facet enhances touch selection and viewing relative to each of the plurality of facets for which the variable size is smaller;
computer readable program code means for receiving an input selection, the input selection being selected from a group consisting of selecting a facet, rotating the icon, pivoting the icon, expanding or contracting the icon, varying the icon interaction level, selecting the menu, selecting one or more of the plurality of sub-menus, and navigating relative to the icon, wherein the input selection is selected based on a manner in which a user makes the input selection; and
computer readable program code means for performing the received input selection.

\* \* \* \* \*